US012706351B2

(12) United States Patent
Kim et al.

(10) Patent No.: US 12,706,351 B2
(45) Date of Patent: Aug. 11, 2026

(54) BATTERY MEMBRANES AND COMPONENTS THEREOF

(71) Applicant: Rivian IP Holdings, LLC, Plymouth, MI (US)

(72) Inventors: Soo Kim, Fremont, CA (US); Yumi Kim, San Jose, CA (US); Sookyung Jeong, San Jose, CA (US); Liyuan Sun, Mountain View, CA (US); Ruidong Yang, Hockessin, DE (US); Tae Kyoung Kim, Albany, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 767 days.

(21) Appl. No.: 18/146,798

(22) Filed: Dec. 27, 2022

(65) Prior Publication Data

US 2024/0213623 A1 Jun. 27, 2024

(51) Int. Cl.

*H01M 50/46* (2021.01)
*H01M 10/0585* (2010.01)
*H01M 10/42* (2006.01)
*H01M 50/449* (2021.01)
*H01M 50/489* (2021.01)
*H01M 50/491* (2021.01)

(52) U.S. Cl.

CPC ....... *H01M 50/46* (2021.01); *H01M 10/0585* (2013.01); *H01M 10/4235* (2013.01); *H01M 50/449* (2021.01); *H01M 50/489* (2021.01); *H01M 50/491* (2021.01); *H01M 2220/20* (2013.01)

(58) Field of Classification Search

None

See application file for complete search history.

(56) References Cited

U.S. PATENT DOCUMENTS 10,601,012 B1 * 3/2020 Shi .................... H01M 50/44
2005/0287425 A1 * 12/2005 Shi .................... H01M 6/181 29/623.5
2011/0244331 A1 * 10/2011 Karthikeyan ......... H01M 4/525 429/223
2012/0288767 A1 * 11/2012 Jo .................... H01M 4/131 252/182.1
2013/0157124 A1 * 6/2013 Hagiyama ......... H01M 10/0567 429/200
2018/0047983 A1 * 2/2018 Mun .................... H01M 4/583
2022/0393239 A1 * 12/2022 Gao .................... H01M 4/62

FOREIGN PATENT DOCUMENTS

CN 111116651 A * 5/2020 ........ H01M 10/0525
CN 113410519 A * 9/2021 ........ H01M 10/4235

OTHER PUBLICATIONS

CN 111116651 A Translation (Year: 2020).*
CN 113410519 A Translation (Year: 2021).*

* cited by examiner

*Primary Examiner* — Anca Eoff
*Assistant Examiner* — Ryan K. Blackwell-Rudasill
(74) *Attorney, Agent, or Firm* — Foley & Lardner LLP

(57) ABSTRACT

Provided herein is a battery cell. The battery cell can include a cation-selective ion-exchange membrane. The cation-selective ion-exchange membrane can allow lithium ions to pass through the membrane. The cation-selective ion-exchange membrane can impede manganese ions from passing through the membrane.

11 Claims, 13 Drawing Sheets

BATTERY MEMBRANES AND COMPONENTS THEREOF

INTRODUCTION

Batteries can have different power capacities to charge and discharge power to operate machines.

SUMMARY

If exposed directly at the electrode surface in contact with liquid electrolytes, manganese ions from manganese-containing cathodes can dissolve (in $Mn^{2+}_{(aq.)}$ form) and further react to form manganese metal ($Mn^0$) at the anode, leading to degradation of the battery. The apparatuses, systems, and methods described herein can reduce or prevent such manganese metal formation.

At least one aspect is directed to a battery cell. The battery cell can include a cation-selective ion-exchange membrane configured to allow lithium ions to pass through the membrane and impede manganese ions from passing through the membrane. The battery cell can include an electrolyte, a cathode including lithium and manganese, and an anode. The membrane can be disposed between the cathode and the anode. The membrane can be in contact with the electrolyte.

The membrane may comprise one or more materials selected from polyaniline (PANi), ethylenediamine polymerized with 1,3,5-benzenetricarbonyl trichloride, polypyrrole (Ppy) coated sulfonated interpolymer of polyethylene (PE), styrene-divinylbenzene copolymer, polyvinylidene fluoride (PVDF), sulfonated polyvinylidene fluoride (S-PVDF), polydiacetylene (PDA), polyethylene diamine (PEDI), MIL-53(Al), charged nanofibers, PANi coated with p-toluenesulfonic acid (p-TSA), doped PANi with S30-valine, electrospun carbon nanofibers, and combinations of any two or more thereof.

The membrane may comprise one or more pores, each of the one or more pores independently having a pore size in a range of 1 nm to 5 μm, including from 1 nm to 150 nm. Additionally or alternatively, the membrane may have a porosity in a range of 5% to 90%, including from 40% to 60%.

A ratio of a transport rate of lithium ions through the membrane to a transport rate of manganese ions through the membrane may be 30:1 or greater, including in a range of 30:1 to 2:1, including from 15:1 to 2:1.

At least one aspect is directed to a method. The method can include disposing a cation-selective ion-exchange membrane as described herein in a battery cell. The battery cell can include an electrolyte, a cathode including lithium and manganese, and an anode. The membrane can be disposed between the cathode and the anode. The membrane can be in contact with the electrolyte. The method optionally can include applying a voltage pulse, the voltage pulse configured to reduce a concentration of manganese ions in the electrolyte. Additionally or alternatively, the method optionally can include applying a voltage pulse, the voltage pulse configured to decompose components of the electrolyte and form HF in the electrolyte.

At least one aspect is directed to a separator. The separator can include a membrane as described herein, e.g., a cation-selective ion-exchange membrane configured to allow lithium ions to pass through the membrane and impede manganese ions from passing through the membrane.

At least one aspect is directed to an electric vehicle. The electric vehicle can include a battery. The battery can include a membrane as described herein. Optionally, the battery includes a separator that includes a membrane as described herein. The battery can include an electrolyte, a cathode including lithium and manganese, and an anode. The membrane and/or separator can be disposed between the anode and the cathode of the battery. The membrane can be in contact with the electrolyte.

At least one aspect is directed to a battery cell. The battery cell can include a membrane as described herein. Optionally, the battery cell includes a separator that includes a membrane as described herein. The battery cell can include an electrolyte, a cathode including lithium and manganese, and an anode. The membrane and/or separator can be disposed between the cathode and the anode. The membrane can be in contact with the electrolyte.

At least one aspect is directed to a system. The system can include a membrane as described herein, optionally present as a separator or a component of a separator that comprises the membrane.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
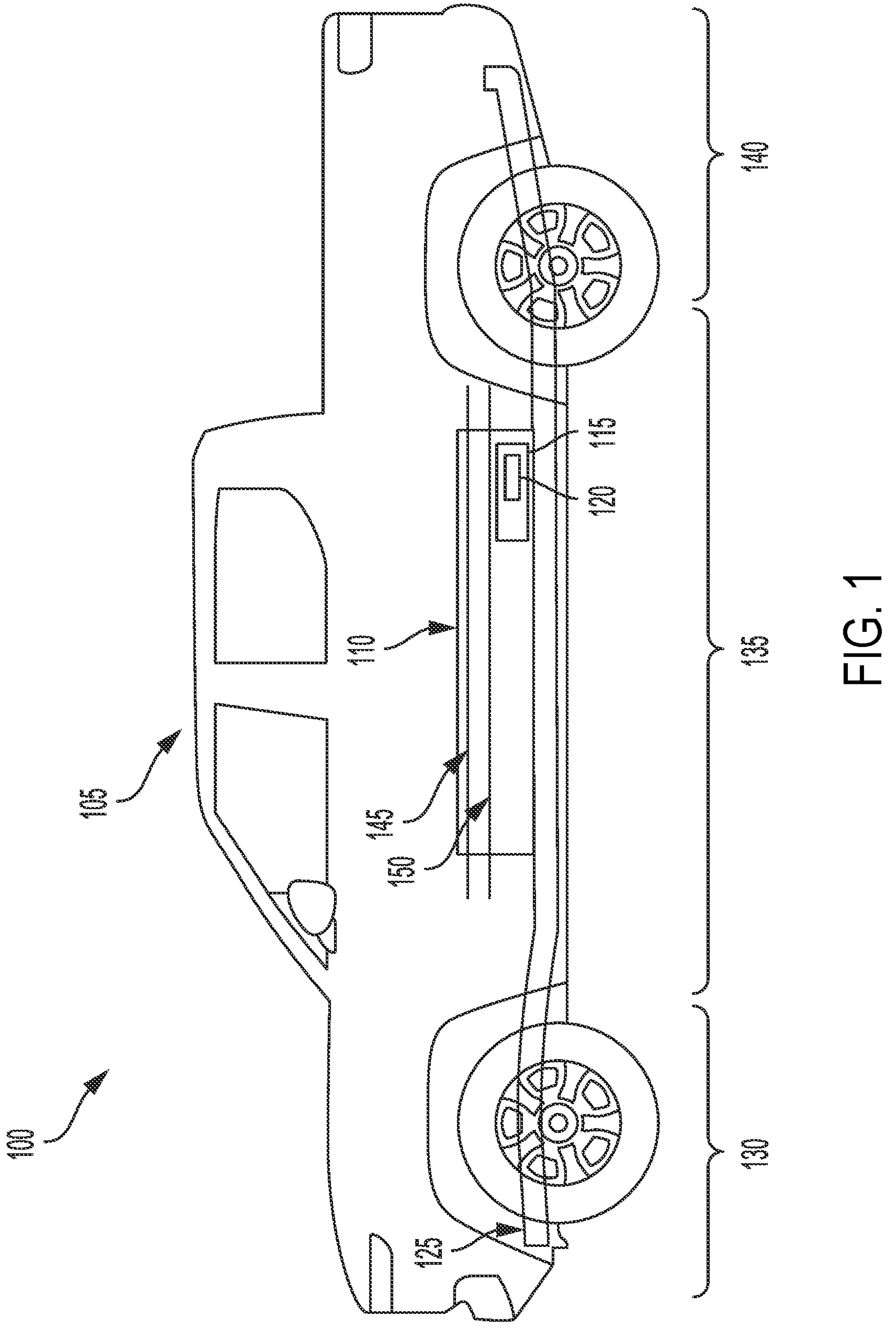
FIG. 1 depicts a cross-sectional view of an electric vehicle, according to an example implementation.

Following below are more detailed descriptions of various concepts related to, and implementations of, methods, apparatuses, and systems of reducing or preventing manganese metal formation. The various concepts introduced above and discussed in greater detail below may be implemented in any of numerous ways.

The present disclosure provides apparatuses, systems and methods useful for reducing or preventing manganese metal formation in a battery. Manganese from manganese-containing cathodes can dissolve in $Mn^{2+}{}_{(aq.)}$ form in liquid electrolytes, and react to form manganese metal ($Mn^0$) at the anode, leading to degradation of the battery. For example, dissolved manganese ions can react with HF present in an electrolyte to form $MnF_2$ in a solid electrolyte interphase of a battery, and further reduction of $MnF_2$ within the electrochemical cell can lead to manganese metal formation and deposition at the anode. Such manganese metal can increase the polarization of the anode and increase the impedance resistance of the battery. This problem may arise in any battery including a Mn-containing cathode. The problem may particularly arise in a battery including a $Mn^{2+}$-containing cathode. The problem also may arise in a battery including a $Mn^{3+}$-containing cathode, where the $Mn^{3+}$ is subject to disproportional reaction to $Mn^{2+}$ and $Mn^{4+}$. A continuous electrochemical reduction of a $Mn^{4+}$-containing cathode, $Mn^{4+}$ may electrochemically reduce to $Mn^{3+}$. $Mn^{4+}$ is generally more stable species in such batteries under typical operating conditions, as compared to $Mn^{2+}$ or $Mn^{3+}$. Thus, in some aspects, the battery includes a $LiMn_aFe_{1-a}PO_4$ (LMFP) cathode, where $0 \leq a \leq 1$. In a LMFP cathode, Mn has an oxidation state of 2+. In some aspects, the battery includes a $LiMn_2O_4$ cathode. In a $LiMn_2O_4$ cathode, Mn has an oxidation state of 3+ and 4+. In some aspects, the battery includes a $Li(Ni_bCo_cMn_{1-b-c})O_2$ (NMC or NMCA) cathode. In NMC or NMCA (A is Aluminum), most Mn ions have an oxidation state of 4+.

Addressing this problem, a technical solution described herein is a membrane, optionally provided as a separator or as a component of a separator that comprises the membrane. The membrane is a cation-selective ion-exchange membrane configured to allow lithium ions to pass through the membrane and impede manganese ions from passing through the membrane. The cation-selective ion-exchange membrane can control transport of monovalent ions (e.g., $Li^+$) and divalent ions (e.g., $Mn^{2+}$) from one electrode to another. The membrane may be disposed in a battery, e.g., between an anode and a cathode of the battery, in contact with electrolyte present in the battery. In some implementations, a voltage pulse may be applied to the battery such that the voltage pulse reduces a concentration of manganese ions in an electrolyte disposed in the battery. The manganese ions may accumulate in the electrolyte between the anode and the separator due to cation-selective ion-exchange membrane. In some implementations, the voltage pulse can decompose components of the electrolyte and form HF in the electrolyte. In some implementations, reaction of manganese ions in the electrolyte with HF may form a cathode solid-electrolyte interface (CEI).

The disclosed technical solutions can reduce or prevent manganese metal formation in the battery. The disclosed membranes and related technical solutions have a technical advantage of permitting transport of $Li^+$ from the cathode side to the anode side during charging and, $Li^+$ transport from the anode side to the cathode side during discharging, while inhibiting and suppressing electrochemical and/or ionic transport of $Mn^{2+}$ from the cathode side to the anode side. The disclosed voltage pulses and related technical solutions can react excess manganese ions in the electrolyte on the cathode side with HF to form a cathode solid-electrolyte interface (CEI). This can reduce the concentration of manganese ions in the electrolyte.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
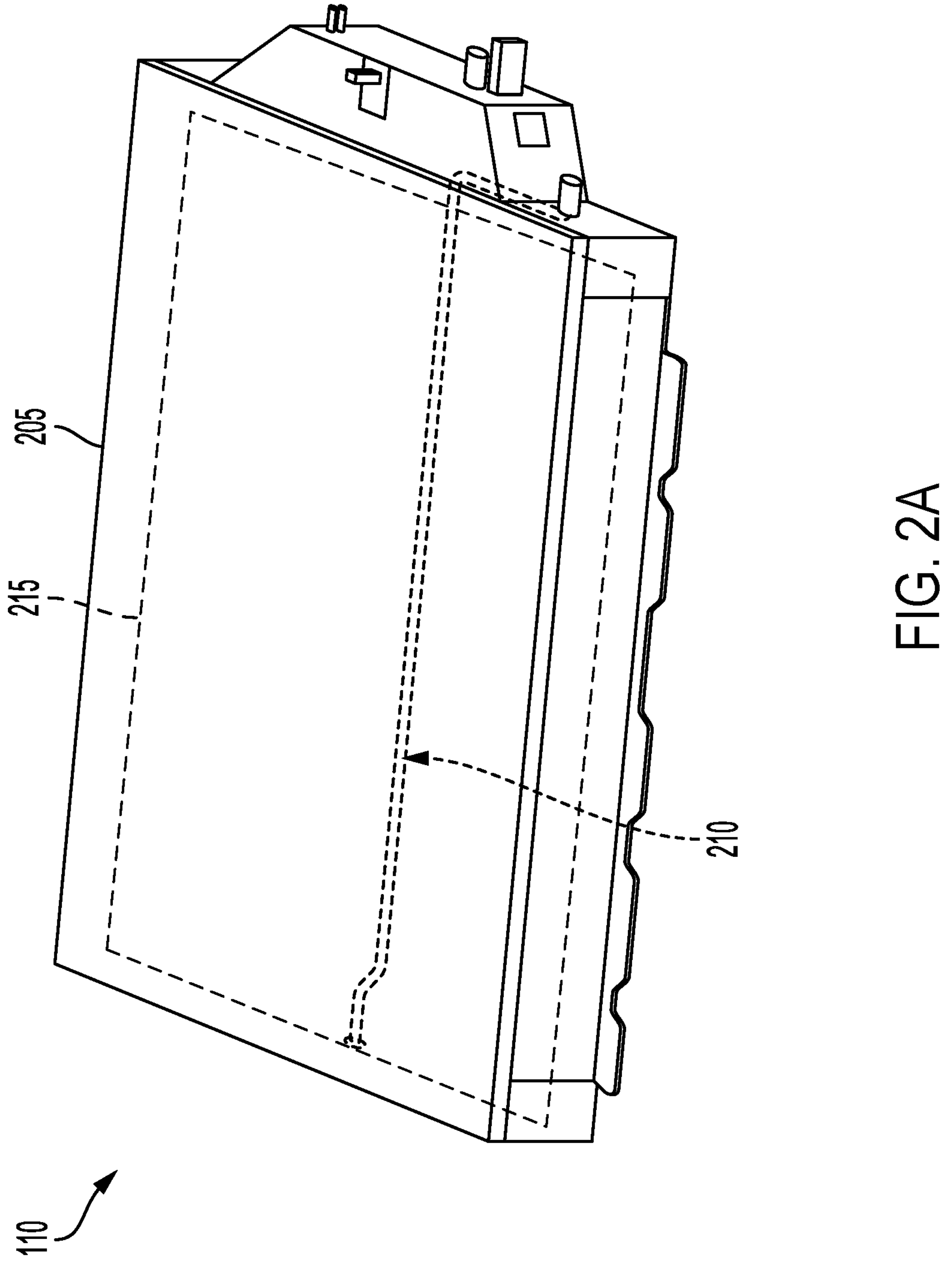
FIG. 2A depicts a battery pack, according to an example implementation.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
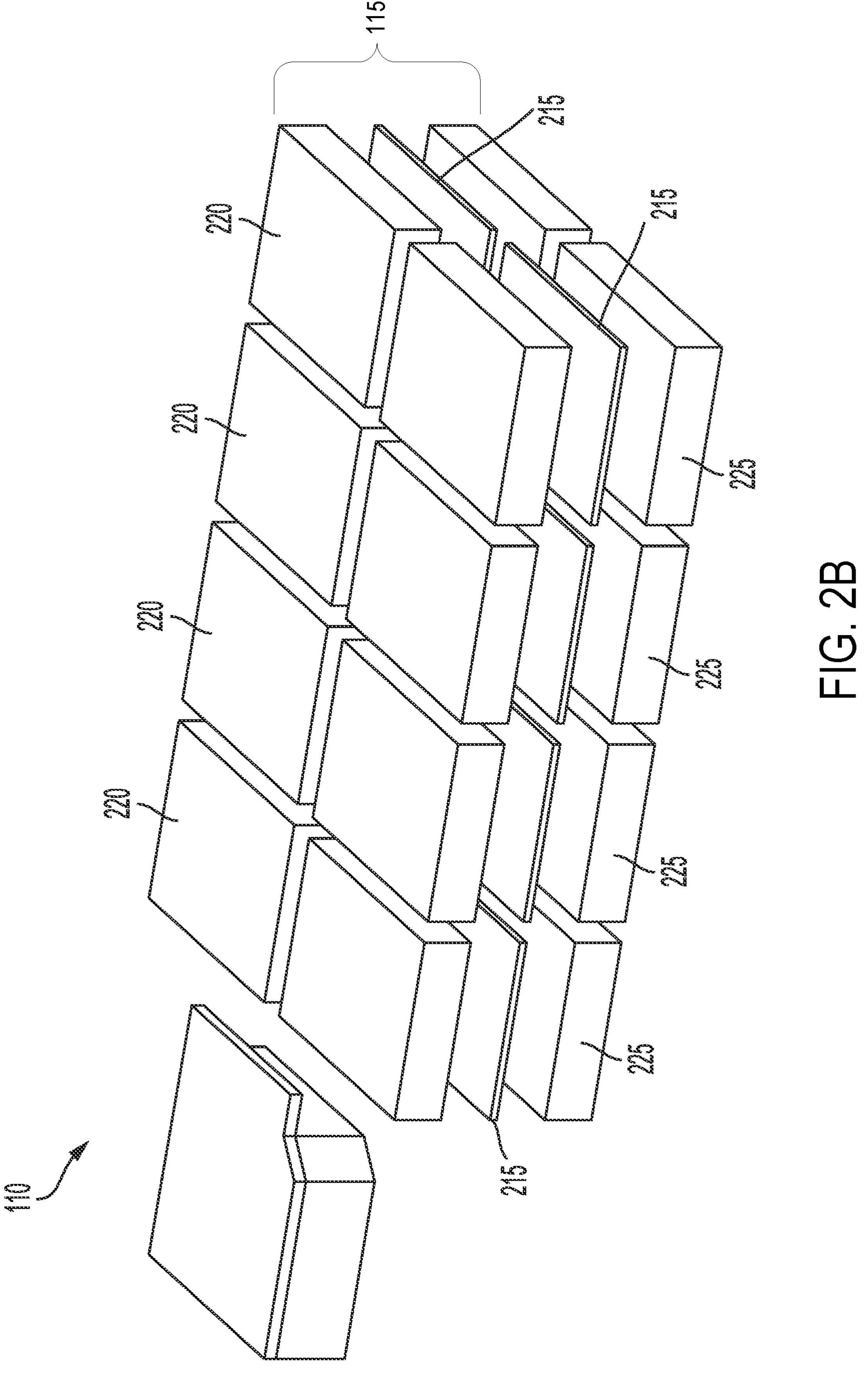
FIG. 2B depicts a battery module, according to an example implementation.
Figure 2C:
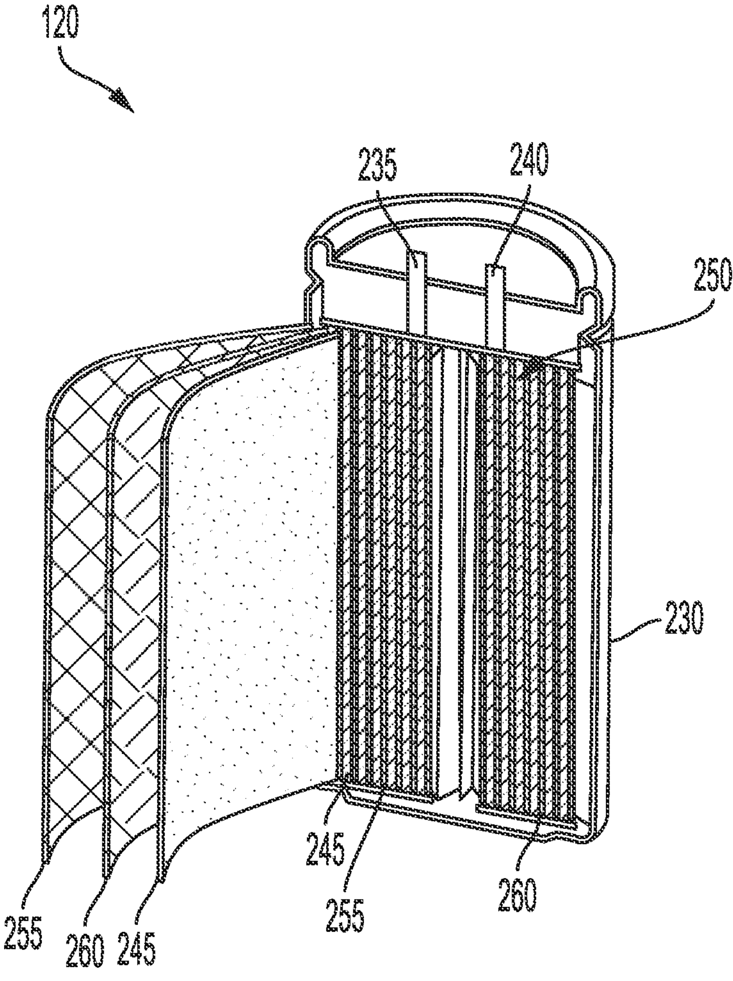
FIG. 2C depicts a cross-sectional view of a battery cell, according to an example implementation.
Figure 2D:
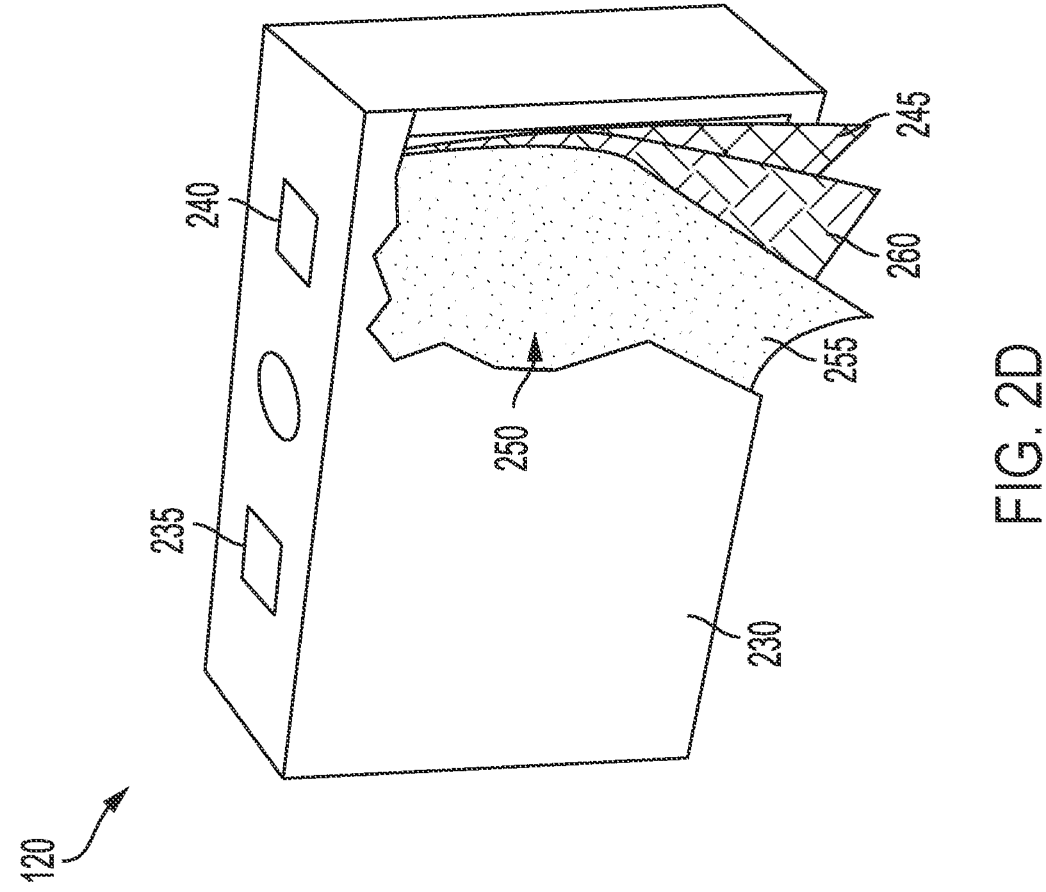
FIG. 2D depicts a cross-sectional view of a battery cell, according to an example implementation.
Figure 2E:
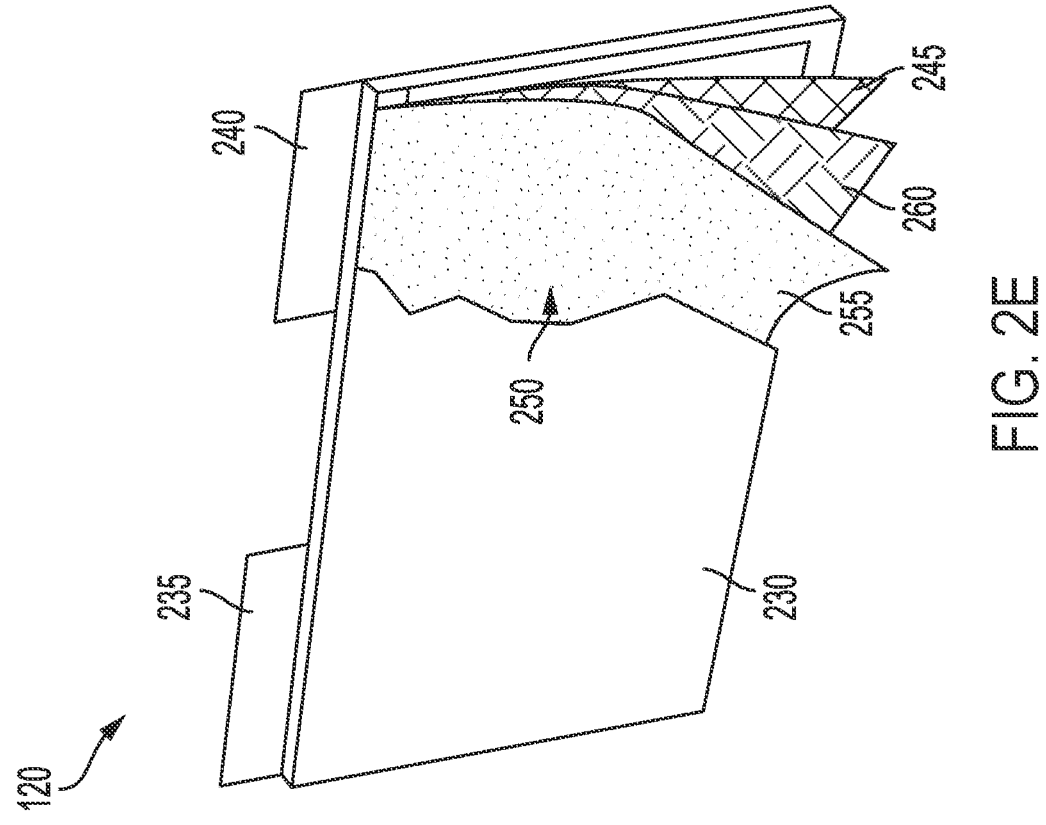
FIG. 2E depicts a cross-sectional view of a battery cell, according to an example implementation.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy, etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy, etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also receive lithium ions during the discharging of the battery cell 120. Conversely, the cathode layer 255 can receive electrical current into the battery cell 120 and can output electrons during the charging of the battery cell 120. The cathode layer 255 can release lithium ions during the charging of the battery cell 120.

The battery cell 120 can include a layer 260 disposed within the cavity 250. The layer 260 can include a separator layer. The layer 260 can include a separator wetted by a liquid electrolyte. The layer 260 can include a polymeric material. The layer 260 can include a polymer separator. The layer 260 can be arranged between the anode layer 245 and the cathode layer 255 to separate the anode layer 245 and the cathode layer 255. The polymer separator can physically separate the anode and cathode from a cell short circuit. A separator can be wetted with a liquid electrolyte. The liquid electrolyte can be diffused into the anode layer 245. The liquid electrolyte can be diffused into the cathode layer 255. Ions (e.g., Lit ions) can diffuse through the layer 260, when wetted by a liquid electrolyte, between the anode layer 245 and the cathode layer 255. The Lit cations from the anode layer 245 to the cathode layer 255 during the discharge operation of the battery cell 120 diffuse through the layer 260. The lithium ions can diffuse through the layer 260 from the cathode layer 255 to the anode layer 245 during the charge operation of the battery cell 120.

When present, the separator of layer 260 can include a porous polymer sheet. A coating can be disposed on the separator. The coating may have a greater porosity as determined by mercury porosimetry than a porosity of the porous polymer sheet, and thus can facilitate Lit ion transport through the coated separator. As the coating material is deposited onto the porous polymer sheet, it may nucleate, e.g., near grain boundaries of the porous polymer sheet. The coating may be single-sided or double-sided on the porous polymer sheet. The coating can face the anode and/or cathode electrodes in the battery cell 120.

The coating can include a single layer coating or a multi-layer coating. The coating can include one or more layers (e.g., a multilayer coating), where at least one layer (e.g., a "first layer") includes $SiO_2$, $Al_2O_3$, AlO(OH), or a mixture of any two or more thereof. At least another layer (e.g., a "second layer") can include ScO(OH), VO(OH), FeO(OH), GaO(OH), MnO(OH), InO(OH), or a mixture of any two or more thereof. In any embodiment herein where the coating includes two or more layers, a layer on the surface of the porous polymer sheet (e.g., the "initial layer") may include voids and/or other irregularities on the surface of the porous polymer sheet. As an additional layer is deposited the initial layer, materials of the additional layer may nucleate near grain boundaries of the initial layer, and/or may fill the voids or uncoated areas left by the initial layer and grow in thickness in those areas as the deposition proceeds. Where the additional layer is deposited on top of the initial layer, the additional layer may be thinner (e.g., to reduce overall electrical resistance).

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LIMPO_4O_x$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The layer 260 can include or be made of a liquid electrolyte material. For example, the layer 260 can be or include at least one layer of polymeric material (e.g., polypropylene, polyethylene, or other material) that is wetted (e.g., is saturated with, is soaked with, receives) a liquid electrolyte substance to enable ions to move between electrodes. The liquid electrolyte material can include a lithium salt dissolved in a solvent. The lithium salt for the liquid electrolyte material for the layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. Liquid electrolyte is not necessarily disposed near the layer 260, but the liquid electrolyte can be filled into the battery cells 120 in many different ways. On the other hand, the layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the layer 260 includes a liquid electrolyte material, the layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 260 can include at least one additive. The additives can be or include vinylidene carbonate, fluoroethylene carbonate, ethyl propionate, methyl propionate, methyl acetate, ethyl acetate, or a mixture of any two or more thereof. The layer 260 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the layer 260 from greater than 0 M to about 1.5 M. Once disposed to the battery cell 120, liquid electrolyte can be present and touching battery subcomponents present within the battery cell 120. The battery subcomponents can include the cathode, the anode, the separator, and the current collector.

Figure 3:
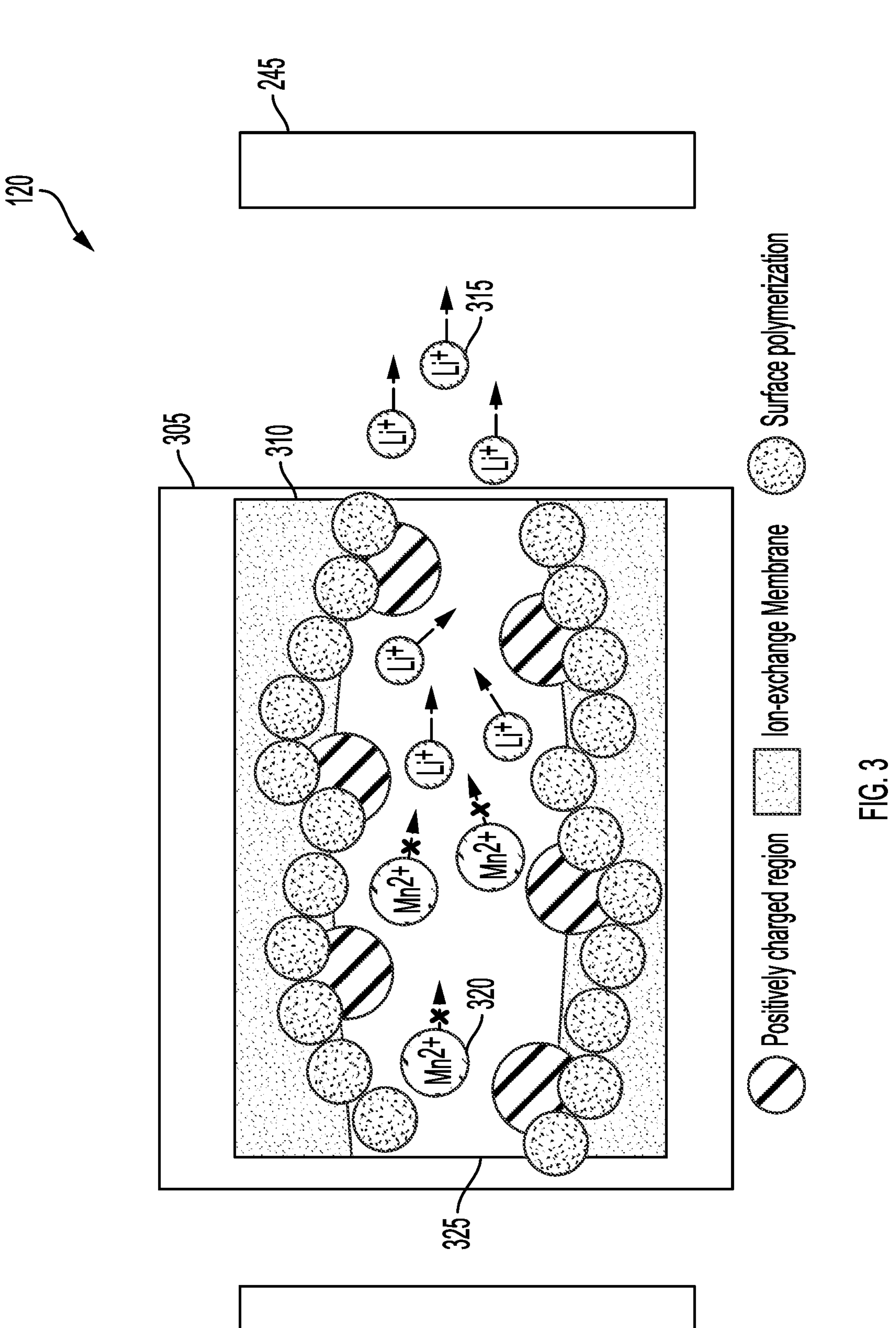
FIG. 3 depicts a perspective view of a battery cell, according to an example implementation.

FIG. 3 depicts a perspective view of battery cell 120. Battery cell 120 can include one or more anode layers 245. Battery cell 120 can include one or more cathode layers 255. The cathode layer 255 can include a cathode. The cathode can include one or more materials selected from LMFP, LMO, $LiMO_2$, $Li_{1+x}M_{1-x}O_2$, and $Li_2MnO_3$, where $0 \le x \le 1$. For example, the cathode can include a Mn-rich $LiMO_2$ and $Li_{1+x}M_{1-x}O_2$ layered cathode. In some aspects, the cathode includes $LiMn_xFe_{1-x}PO_4$ (LMFP) material. In some aspects, the cathode includes $LiMn_2O_4$ material. In some aspects, the cathode includes $LiNi_{0.5}Mn_{1.5}O_4$ spinel material.

As noted above, described herein is a separator (e.g. separator 305) that can be comprised of or include a cation-selective ion-exchange membrane configured to allow lithium ions to pass through the membrane and impede manganese ions from passing through the membrane (e.g., membrane 310). Thus, battery cell 120 can include one or more separators 305 (e.g., separator film). Separator 305 can be configured as the separator of layer 260 described above. Battery cell 120 can include the cation-selective ion-exchange membrane configured to allow lithium ions to pass through the membrane and impede manganese ions from passing through the membrane. Separator 305 can include a polymer-based separator.

Separator 305 can include one or more membranes 310. The battery cell 120 can include one or more membranes 310. Membrane 310 can include an ion-exchange membrane. For example, the membrane 310 can include a cation-selective ion-exchange membrane (e.g., a monovalent cation-selective ion-exchange membrane). The cation-selective ion-exchange membrane can control transport of monovalent ions (e.g., $Li^+$) and divalent ions (e.g., $Mn^{2+}$). For example, the cation-selective ion-exchange membrane can allow lithium ions to pass through the membrane and impede manganese ions from passing through the membrane. When disposed between two electrodes, the cation-selective ion-exchange membrane of separator 305 can control transport of ions from one electrode to another. For example, when disposed between the cathode and the anode, the cation-selective ion-exchange membrane of separator 305 can control transport of ions from the cathode layer 255 to the anode layer 245. Likewise, the cation-selective ion-exchange membrane can control transport of ions from the cathode side of battery cell 120 to the anode side of battery cell 120. The cation-selective ion-exchange membrane can control transport of ions from the anode side of battery cell 120 to the cathode side of battery cell 120.

Membrane 310 can be formed from any suitable material that selectively permits passage of monovalent cations such as lithium ions relative to divalent cations such as manganese ions. In some implementations, membrane 310 is formed from a cation ion exchange material with a pore size suitable for allowing lithium ions to pass through membrane 310 and impeding manganese ions from passing through membrane 310. In some implementations, membrane 310 is formed from or comprises one or more materials selected from polyaniline (PANi), ethylenediamine polymerized with 1,3,5-benzenetricarbonyl trichloride, polypyrrole (Ppy) coated sulfonated interpolymer of polyethylene (PE), styrene-divinylbenzene copolymer, polyvinylidene fluoride (PVDF), sulfonated polyvinylidene fluoride (S-PVDF), polydiacetylene (PDA), polyethylene diamine (PEDI), MIL-53(Al), charged nanofibers, PANi coated with p-toluenesulfonic acid (p-TSA), doped PANi with S30-valine, electrospun carbon nanofibers, and combinations of any two or more thereof.

In some implementations, membrane 310 is surface polymerized. For example, membrane 310 can include areas of surface polymerization. The areas of surface polymerization can include positively charged or partially positively charged regions. The positively charged regions of the surface polymerized membrane can impede or suppress transport of divalent cations through membrane 310. The positively charged regions of the surface polymerized membrane can impede or suppress transport of $Mn^{2+}$ through membrane 310. The positively charged regions of the surface polymerized membrane can allow for transport of $Li^+$ through membrane 310.

Membrane 310 is generally designed and constructed such that lithium ions 315 (e.g., $Li^+$) can pass through membrane 310. As noted above, positively charged regions of the surface polymerized membrane can allow for transport of $Li^+$ through membrane 310. The positively charged regions of the surface polymerized membrane can allow for transport of monovalent ions through membrane 310. Membrane 310 can permit transport of lithium ions 315 from the cathode side of battery cell 120 to the anode side of battery cell 120. In some implementations, transport of lithium ions 315 from the cathode side of battery cell 120 to the anode side of battery cell 120 is unaffected by membrane 310, e.g., membrane 310 does not impede transport of lithium ions 315. The lithium ions 315 can penetrate membrane 310.

Membrane 310 is generally designed and constructed such that transport of manganese ions 320 (e.g., $Mn^{2+}$) through membrane 310 is impeded. As noted above, positively charged regions of the surface polymerized membrane can impede or suppress transport of $Mn^{2+}$ through membrane 310. The positively charged regions of the surface polymerized membrane can impede or suppress transport of divalent ions through membrane 310. Membrane 310 can inhibit, impede, suppress, or slow down transport of manganese ions 320 from the cathode side of battery cell 120 to the anode side of battery cell 120. The transport of manganese ions 320 from the cathode side of battery cell 120 to the anode side of battery cell 120 can be inhibited, impeded, suppressed, or slowed down by membrane 310. Membrane 310 can contain manganese ions 320 to the cathode side of battery cell 120.

Membrane 310 can include one or more pores 325. Each of the one or more pores 325 can independently have a pore size in a range of 1 nm to 5 μm, typically in a range of 1 nm to 150 nm. For example, each of the one or more pores 325 can have a pore size in a range of 1 nm to 10 nm, 1 nm to 50 nm, 1 nm to 100 nm, 1 nm to 150 nm, 1 nm to 500 nm, 1 nm to 1 μm, 1 nm to 2 μm, 1 nm to 5 μm, including 10 nm to 50 nm. 10 nm to 75 nm, 10 nm to 100 nm, 10 nm to 150 nm, 10 nm to 500 nm, 10 nm to 1 μm. 10 nm to 2 μm, 10 nm to 5 μm, or 50 nm to 100 nm, 50 nm to 150 nm, 50 nm to 500 nm, 50 nm to 1 μm, 50 nm to 2 μm, 50 nm to 5 μm, or 75 nm to 100 nm, 75 nm to 150 nm, 100 nm to 150 nm, 100 nm to 500 nm, 100 nm to 1 μm, 100 nm to 2 μm, 100 nm to 5 μm, 150 nm to 500 nm, 150 nm to 1 μm. 150 nm to 2 μm, 150 nm to 5 μm, 500 nm to 1 μm, 500 nm to 2 μm, 500 nm to 5 μm, 1 nm to 2 μm, 1 nm to 5 μm, or 2 nm to 5 μm, or any value therebetween. As used herein, the term "pore size" refers to the longest diameter of a pore.

Membrane 310 can have a porosity in a range of 5% to 90% typically in a range of 40% to 60%. For example, membrane 310 can have a porosity in a range of 5% to 10%, 5% to 20%, 5% to 30%, 5% to 40%, 5% to 50%, 5% to 60%, 5% to 70%, 5% to 80%, 5% to 90%, 10% to 20%, 10% to 30%, 10% to 40%, 10% to 50%, 10% to 60%, 10% to 70%, 10% to 80%, 10% to 90%, 20% to 30%, 20% to 40%, 20% to 50%, 20% to 60%, 20% to 70%, 20% to 80%, 20% to 90%, 30% to 40%, 30% to 50%, 30% to 60%, 30% to 70%, 30% to 80%, 30% to 90%, 40% to 50%, 40% to 60%, 40% to 70%, 40% to 80%, 40% to 90%, 50% to 60%, 50% to 70%, 50% to 80%, 50% to 90%, 60% to 70%, 60% to 80%, 60% to 90%, 70% to 80%, 70% to 90%, or 80% to 90%, or any value therebetween. As used herein, the term "porosity" refers to the void volume fraction of membrane 310, and is defined as the volume of the pores divided by the total volume of membrane 310.

Membrane 310 can have a transport rate of lithium ions 315. The transport rate of lithium ions can be defined as the rate of transport of lithium ions 315 through membrane 310. Membrane 310 can have a transport rate of manganese ions 320. The transport rate of manganese ions can be defined as the rate of transport of manganese ions 320 through membrane 310. The transport rate of lithium ions can be greater than the transport rate of manganese ions. The transport rate of manganese ions can be less than the transport rate of lithium ions. The exact rate of transport of lithium and manganese ions may depend on the C-rate, charging/discharge conditions, any separator coating, the ionic/electronic conductivity of electrode materials, and the electrolyte composition, such as salts, solvents, and/or other additives. In some implementations, a ratio of the transport rate of lithium ions 315 through membrane 310 to the transport rate of manganese ions 320 through membrane 310 is 30:1 or greater. In some implementations, the ratio is in a range of 30:1 to 2:1. For example, the ratio of the transport rate of lithium ions 315 through membrane 310 to the transport rate of manganese ions 320 through membrane 310 can be 30:1 or greater, or in a range of 30:1 to 15:1, 30:1 to 12:1, 30:1 to 10:1, 30:1 to 7:1, 30:1 to 5:1, 30:1 to 2:1, 15:1 to 12:1, 15:1 to 10:1, 15:1 to 7:1, 15:1 to 5:1, 15:1 to 2:1, 12:1 to 10:1, 12:1 to 7:1, 12:1 to 5:1, 12:1 to 2:1, 10:1 to 7:1, 10:1 to 5:1, 10:1 to 2:1, 7:1 to 5:1, 7:1 to 2:1, or 5:1 to 2:1, or any value therebetween. As an example, a ratio of 15:1 indicates that fifteen lithium ions 315 pass through membrane 310 for every one manganese ion 320 that passes through membrane 310. In another example, a ratio of 12:1 indicates that twelve lithium ions 315 pass through membrane 310 for every one manganese ion 320 that passes through membrane 310. In some embodiments, the ratio of the transport rate of lithium ions 315 through membrane 310 to the transport rate of manganese ions 320 through membrane 310 can be much greater than 15:1 (i.e., significantly more lithium ions are passing through the membrane vs. Mn ions). For example, the ratio of the transport rate of lithium ions 315 through membrane 310 to the transport rate of manganese ions 320 through membrane 310 can be 20:1, 30:1, 40:1, 50:1, or 100:1. As noted above, the exact rate of transport of the ions may differ depending on the C-rate, charging/discharge conditions, separator coating, ionic/electronic conductivity of electrode materials, electrolyte composition, salt, solvent, and/or additives.

Figure 4:
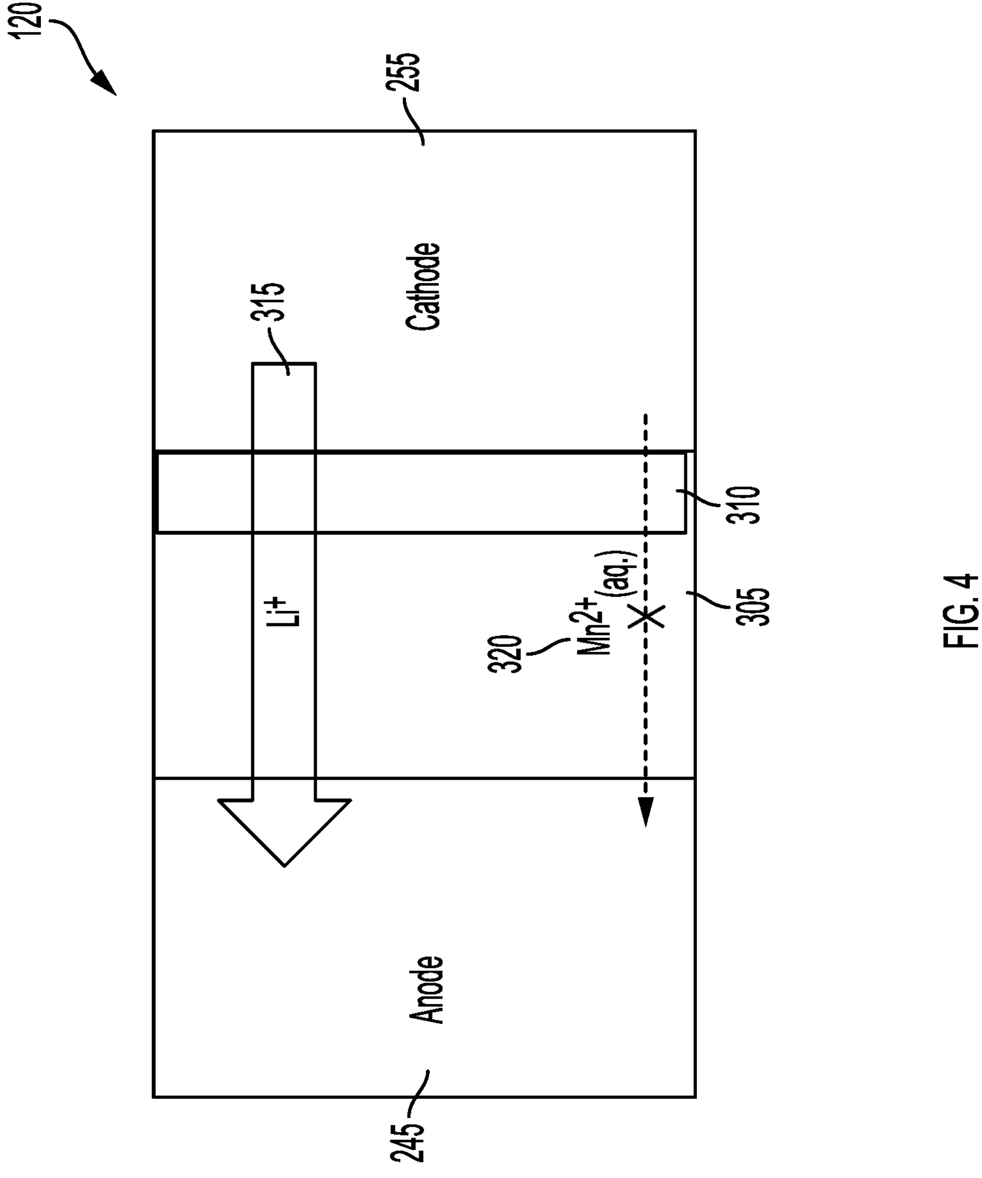
FIG. 4 depicts a perspective view of a battery cell, according to an example implementation.

FIG. 4 depicts a perspective view of battery cell 120. Battery cell 120 can include the anode layer 245, the cathode layer 255, and separator 305. Separator 305 can include membrane 310. Membrane 310 can allow lithium ions 315 to pass through membrane 310. Membrane 310 can permit transport of lithium ions 315 from the cathode side of battery cell 120 to the anode side of battery cell 120. Membrane 310 can impede manganese ions 320 from passing through membrane 310. Membrane 310 can inhibit, impede, suppress, or slow down transport of manganese ions 320 from the cathode side of battery cell 120 to the anode side of battery cell 120.

Figure 5:
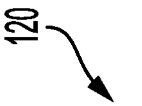
FIG. 5 depicts a perspective view of a battery cell, according to an example implementation.
Figure 5:
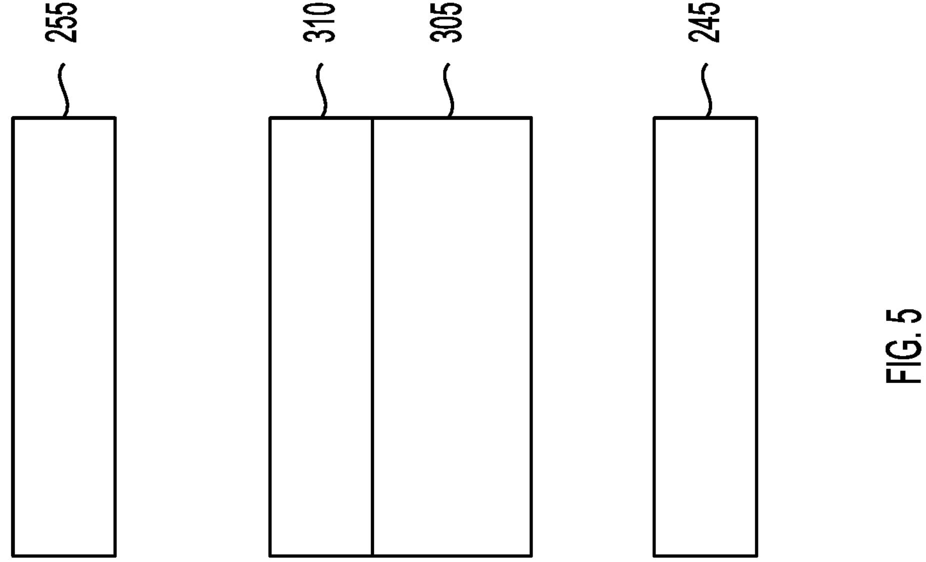

FIG. 5 depicts a perspective view of battery cell 120. Battery cell 120 can include the anode layer 245, the cathode layer 255, and separator 305. Separator 305 can be adjacent to membrane 310. Membrane 310 can be disposed on separator 305. Membrane 310 can be disposed on a side of separator 305 that is facing the cathode layer 255. Membrane 310 can be disposed on a side of separator 305 that is facing the anode layer 245 (not shown).

Figure 6:
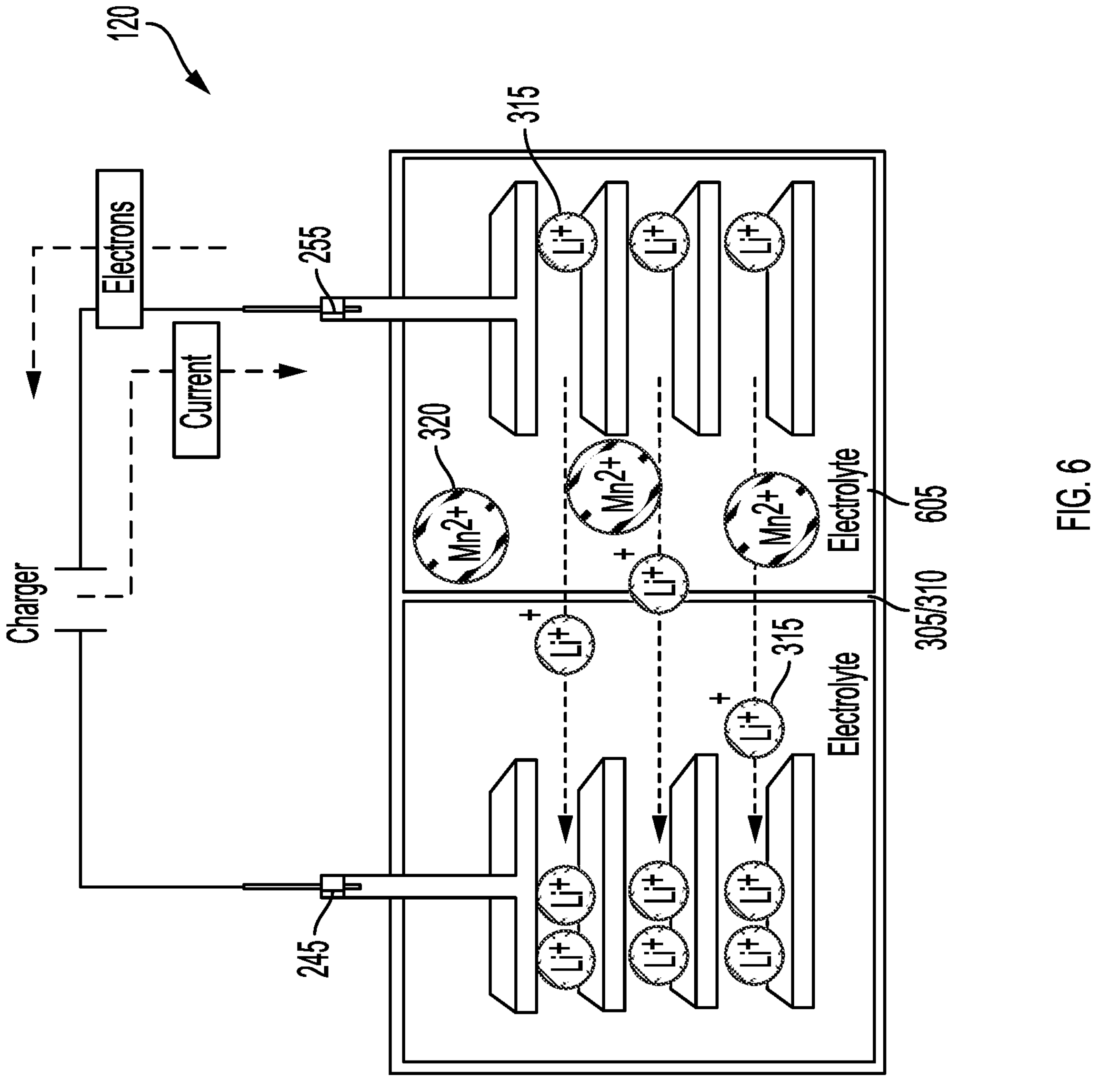
FIG. 6 depicts a perspective view of a battery cell, according to an example implementation.

FIG. 6 depicts a perspective view of battery cell 120. Battery cell 120 can include the anode layer 245, the cathode layer 255, and separator 305. The separator can include membrane 310 or be adjacent to membrane 310. Membrane 310 can allow lithium ions 315 to pass through membrane 310. Membrane 310 can permit transport of lithium ions 315 from the cathode side of battery cell 120 to the anode side of battery cell 120. Membrane 310 can impede manganese ions 320 from passing through membrane 310. Membrane 310 can inhibit, impede, suppress, or slow down transport of manganese ions 320 from the cathode side of battery cell 120 to the anode side of battery cell 120. The manganese ions 320 can be localized to the cathode side of battery cell 120. Battery cell 120 can include an electrolyte 605. The electrolyte 605 can include a liquid electrolyte, a solid electrolyte, or a hybrid solid-state liquid electrolyte. The electrolyte 605 and the separator 305 can be configured as the layer 260 (not shown).

Figure 7:
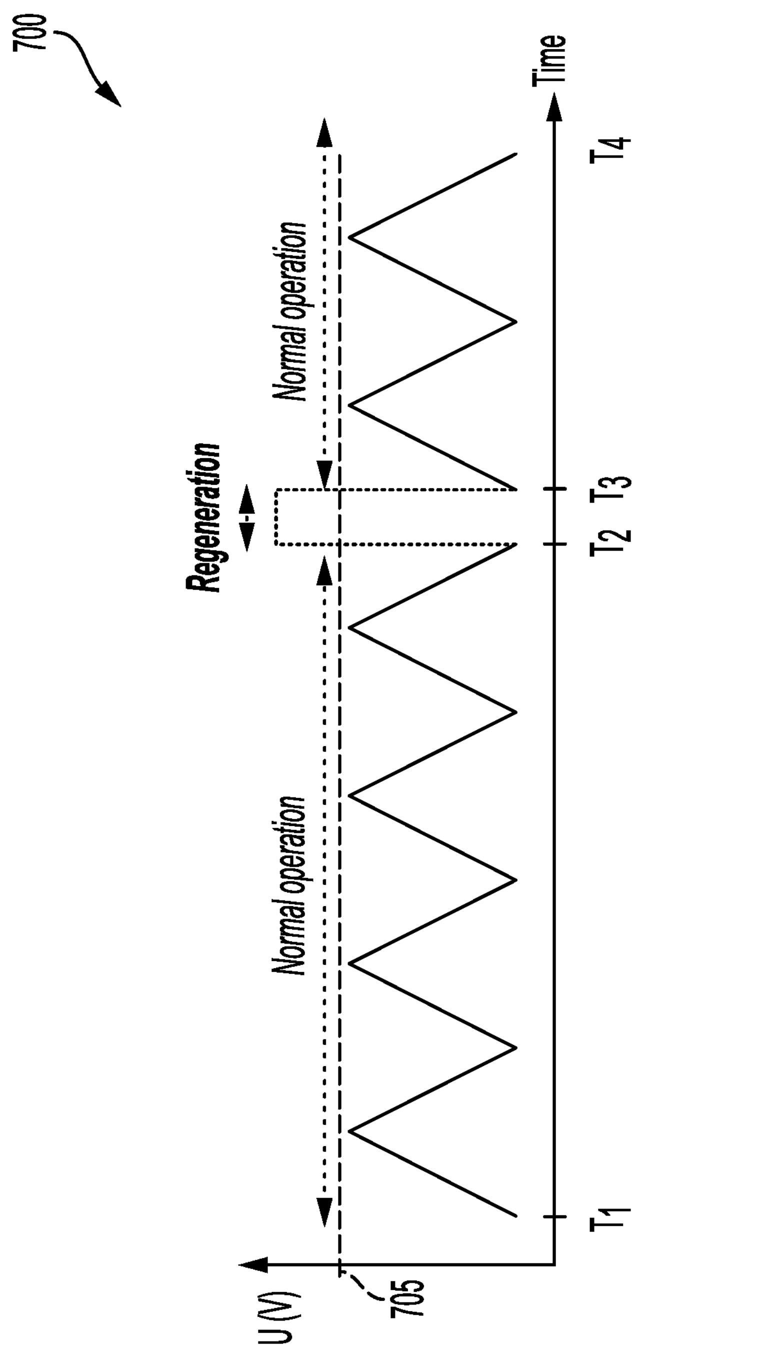
FIG. 7 depicts a plot of potential vs. time for operation of a battery cell, according to an example implementation.

FIG. 7 depicts a plot 700 of potential vs. time for operation of battery cell 120 including a separator 305 with a membrane 310 as described herein. During normal operation of battery cell 120, the voltage of battery cell 120 can be less than a threshold voltage 705. For example, during a time interval $T_1 \leq t < T_2$, the voltage of battery cell 120 can be less than the threshold voltage 705. During a time interval $T_3 \leq t < T_4$, the voltage of battery cell 120 can be less than the threshold voltage 705.

Gradual accumulation of manganese ions 320 in the electrolyte 605 due to the presence of separator 305 with a membrane 310 as described herein can lead to resistance in battery cell 120. As illustrated in FIG. 6, manganese ions 320 can accumulate in the electrolyte 605 on the cathode side of battery cell 120. A regeneration protocol can include applying a voltage higher than the threshold voltage 705. During the regeneration protocol, the voltage of battery cell 120 can be greater than the threshold voltage 705.

For example, during a time interval $T_2 \leq t < T_3$, the voltage of battery cell 120 can be greater than the threshold voltage 705. The time interval between $T_2$ and $T_3$ can be in a range of 1 millisecond to 60 seconds. For example, the time interval between $T_2$ and $T_3$ can be in a range of 1 millisecond to 10 milliseconds, 1 millisecond to 50 milliseconds, 1 millisecond to 100 milliseconds, 1 millisecond to 500 milliseconds, 1 millisecond to 1 second, 1 millisecond to 2 seconds, 1 millisecond to 5 seconds, 1 millisecond to 10 seconds, 1 millisecond to 30 seconds, 1 millisecond to 60 seconds, 10 milliseconds to 50 milliseconds, 10 milliseconds to 100 milliseconds, 10 milliseconds to 500 milliseconds, 10 milliseconds to 1 second, 10 milliseconds to 2 seconds, 10 milliseconds to 5 seconds, 10 milliseconds to 10 seconds, 10 milliseconds to 30 seconds, or 10 milliseconds to 60 seconds. The time interval between $T_2$ and $T_3$ can be in a range of 50 milliseconds to 100 milliseconds, 50 milliseconds to 500 milliseconds, 50 milliseconds to 1 second, 50 milliseconds to 2 seconds, 50 milliseconds to 5 seconds, 50 milliseconds to 10 seconds, 50 milliseconds to 30 seconds, 50 milliseconds to 60 seconds, 100 milliseconds to 500 milliseconds, 100 milliseconds to 1 second, 100 milliseconds to 2 seconds, 100 milliseconds to 5 seconds, 100 milliseconds to 10 seconds, 100 milliseconds to 30 seconds, 100 milliseconds to 60 seconds, 500 milliseconds to 1 second, 500 milliseconds to 2 seconds, 500 milliseconds to 5 seconds, 500 milliseconds to 10 seconds, 500 milliseconds to 30 seconds, 500 milliseconds to 60 seconds, 1 second to 2 seconds, 1 second to 5 seconds, 2 second to 5 seconds, 2 seconds to 10 seconds, 2 seconds to 30 seconds, 2 seconds to 60 seconds, 5 seconds to 10 seconds, 5 seconds to 30 seconds, 5 seconds to 60 seconds, 10 seconds to 30 seconds, 10 seconds to 60 seconds, or 30 seconds to 60 seconds.

The regeneration protocol can include a voltage pulse. For example, the voltage pulse can include a high voltage pulse (e.g., a voltage pulse greater than the threshold voltage 705). The voltage of the voltage pulse can be in a range of 3.7 vs. $Li/Li^+$ to 4.5 V vs. $Li/Li^+$. For example, the voltage pulse can be in a range of 3.7 V vs. $Li/Li^+$ to 3.9 V vs. $Li/Li^+$, 3.7 V vs. $Li/Li^+$ to 4.1 V vs. $Li/Li^+$, 3.7 V vs. $Li/Li^+$ to 4.3 V vs. $Li/Li^+$, 3.7 V vs. $Li/Li^+$ to 4.5 V vs. $Li/Li^+$, 3.9 V vs. $Li/Li^+$ to 4.1 V vs. $Li/Li^+$, 3.9 V vs. $Li/Li^+$ to 4.3 V vs. $Li/Li^+$, 3.9 V vs. $Li/Li^+$ to 4.5 V vs. $Li/Li^+$, 4.1 V vs. $Li/Li^+$ to 4.3 V vs. $Li/Li^+$, 4.1 V vs. $Li/Li^+$ to 4.5 V vs. $Li/Li^+$, or 4.3 V vs. $Li/Li^+$ to 4.5 V vs. $Li/Li^+$, or any value therebetween. In some embodiments, the high voltage pulse is greater than 4.0 V vs. $Li/Li^+$. For example, electrolyte decomposition can be rapidly accelerated if 4.2 V vs. $Li/Li^+$ is used for a rapid regeneration.

The voltage pulse can be controlled by a battery management system (BMS). For example, a battery management system can be configured to monitor direct current resistance in battery cell 120 and implement a voltage pulse when the resistance reaches a predetermined level. The BMS can control one or more of the voltage, current, temperature, cooling, and heating of the battery cell 120. A more precise method can utilize an active on-board impedance control unit, which may include an AC-DC converting system. In this way, electrochemical impedance spectroscopy (EIS) can be deconvoluted non-destructively using different low to high frequency ranges. An alternative method can include checking a differential capacity curve and calculating differences from previous value sets. The redox peak that corresponds to $Mn^{2+}/Mn^{3+}$ (or, $Mn^{3+}/Mn^{4+}$ in other Mn-based chemistry) may be shifted or decrease the overall size of peak. The differential capacity can indicate a direct change in the Mn redox peak, and thus indicate whether Mn dissolution has or has not occurred. The BMS system can use the mathematical derivative of a voltage vs. capacity curve from both charge/discharge cycle curves and extract the difference in the redox behavior from the previous and subsequent data sets. The BMS can send a signal for regenerating the battery cell by applying a high voltage pulse. The BMS can send the signal in response to an increase in the direct current resistance (DCR) in the battery cell 120. An increase in the direct current resistance can be caused by various factors, such as Mn dissolution, modification of battery subcomponents, or degradation of battery subcomponents. Thus, for example, if Mn ions have dissolved or been displaced from the host cathode material (e.g., are residing in the liquid electrolyte and/or have been redeposited onto other components of the cell), the BMS signal can be sent. Thus, the BMS signal can be sent in response to Mn ions dissolving from the host cathode material. Additionally or alternatively, the BMS signal can be sent in response to Mn ions dissolving into the liquid electrolyte. Additionally or alternatively, the BMS signal can be sent in response to Mn deposition on battery subcomponents. For example, Mn ions can migrate or redeposit onto one or both of membrane 310 and the cathode.

The voltage pulse can generate a chemical scavenger from decomposition of the electrolyte 605. For example, the following chemical reactions can occur due to the voltage pulse:

$$LiPF_6 \rightarrow LiF + PF_5 \quad (1)$$

$$PF_5 + H_2O \rightarrow POF_3 + 2HF \quad (2)$$

The voltage pulse can decompose the electrolyte 605 (e.g., $LiPF_6$) to form $LiF+PF_5$ as shown in Reaction 1. $PF_5$ can react with $H_2O$ to form $POF_3$+2 HF as shown in Reaction 2. Excess manganese ions 320 on the cathode side of battery cell 120 can chemically react with HF. HF can react with manganese ions 320 to form $MnF_2$ and $H_2$ as shown in Reaction 3:

$$Mn^{2+} + 2HF + 2e^- \rightarrow MnF_2 + H_2 \quad (3)$$

$MnF_2$ produced by Reactions 1-3 can form a cathode solid-electrolyte interphase (CEI). The CEI can protect the cathode materials from degradation.

The voltage pulse can reduce a concentration of manganese ions 320 in the electrolyte 605. For example, the voltage pulse can reduce the concentration of manganese ions 320 in the electrolyte 605 through the Reactions 1-3. Thus, the voltage pulse can reduce the concentration of manganese ions 320 in the electrolyte 605 on the cathode side of battery cell 120.

Figure 8:
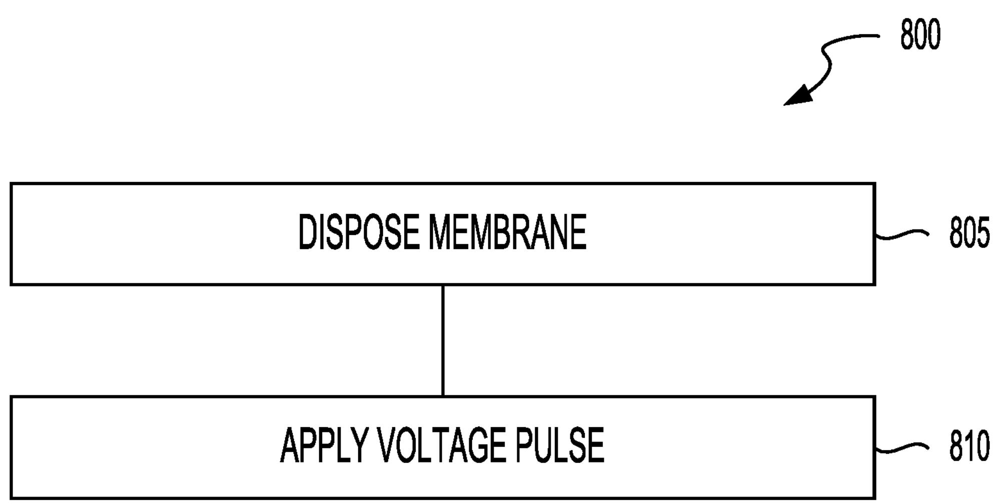
FIG. 8 depicts a method of reducing or preventing manganese metal formation, according to an example implementation.

FIG. 8 depicts a method 800 of reducing or preventing manganese metal formation in a battery. The method 800 can include disposing a membrane as described herein (e.g. a membrane 310 as described herein in a battery cell (e.g. battery cell 120 as described herein) (ACT 805). For example, the method 800 can include disposing a cation-selective ion-exchange membrane as described herein in a battery cell 120 as described herein. Battery cell 120 can include electrolyte 605 as described herein, a cathode as described herein, and an anode as described herein. The cathode can include lithium and manganese, as described above. The electrolyte 605 can include salts and/or additives, such as $LiPF_6$. Membrane 310 can be disposed between the cathode and the anode. Membrane 310 can be in contact with the electrolyte 605. Membrane 310 can be configured to allow lithium ions 315 to pass through membrane 310. Membrane 310 can impede manganese ions 320 from passing through membrane 310.

In some aspects, the method 800 can include applying one or more voltage pulses as described herein (ACT 810). The voltage pulse can reduce a concentration of manganese ions 320 in the electrolyte 605. For example, the voltage pulse can reduce the concentration of manganese ions 320 in the electrolyte 605 through the reactions shown in Reaction 1, Reaction 2, and Reaction 3. The voltage pulse can generate a reaction that decomposes one or more components of the electrolyte 605, such as salts and/or additives. The voltage pulse can form HF in the electrolyte 605. The voltage pulse can decompose components of the electrolyte 605 to form HF in the electrolyte 605, e.g., by Reactions 1-2. The HF formed in the electrolyte 605 can react with dissolved manganese ions 320 present in the electrolyte 605 to form a cathode solid electrolyte interphase (e.g., CEI layers), e.g. by Reaction 3. The CEI can include $MnF_2$. The CEI can protect the cathode materials from degradation. The CEI can serve as a protective layer on the cathode. CEI layers including $MnF_2$ can be disposed on the surface of the cathode.

In some aspects, the method 800 can include disposing membrane 310 as described herein on a separator, e.g. a separator film (e.g., separator 305).

Figure 9:
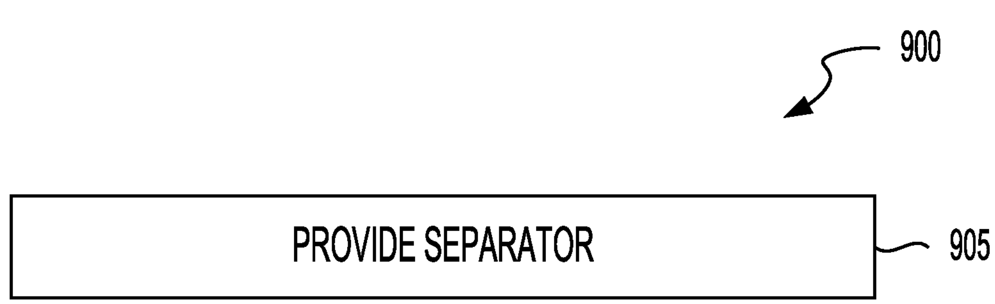
FIG. 9 depicts a method of providing a separator, according to an example implementation.

FIG. 9 depicts a method 900 of providing a separator 305 (ACT 905). Separator 305 can include one or more membranes 310 as described herein (e.g., a cation-selective ion-exchange membrane). Membrane 310 can allow lithium ions 315 to pass through membrane 310 and impede manganese ions 320 from passing through membrane 310.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method, comprising:

disposing a cation-selective ion-exchange membrane in a battery cell comprising an electrolyte, a cathode comprising lithium and manganese, and an anode, wherein the membrane is disposed between the cathode and the anode, and the membrane is in contact with the electrolyte; and applying a voltage pulse, the voltage pulse configured to reduce a concentration of manganese ions in the electrolyte, wherein the membrane is configured to allow lithium ions to pass through the membrane and impede manganese ions from passing through the membrane.

2. The method of claim 1, wherein the voltage pulse is configured to generate a reaction that decomposes one or more components of the electrolyte to form HF in the electrolyte.

3. The method of claim 2, wherein the HF formed in the electrolyte reacts with dissolved manganese ions present in the electrolyte to form a cathode solid electrolyte interphase (CEI).

4. The method of claim 1, wherein disposing the membrane in the battery cell comprises disposing the membrane on a separator film in the battery cell.

5. The method of claim 1, wherein the membrane comprises one or more materials selected from polyaniline (PANi), ethylenediamine polymerized with 1,3,5-benzenetricarbonyl trichloride, polypyrrole (Ppy) coated sulfonated interpolymer of polyethylene (PE), styrene-divinylbenzene copolymer, polyvinylidene fluoride (PVDF), sulfonated polyvinylidene fluoride (S-PVDF), polydiacetylene (PDA), polyethylene diamine (PEDI), MIL-53(Al), charged nanofibers, PANi coated with p-toluenesulfonic acid (p-TSA), doped PANi with S30-valine, electrospun carbon nanofibers, and combinations of any two or more thereof.

6. The method of claim 1, wherein the membrane comprises one or more pores, each of the one or more pores independently having a pore size in a range of 1 nm to 5 μm.

7. The method of claim 1, wherein the membrane comprises one or more pores, each of the one or more pores independently having a pore size in a range of 1 nm to 150 nm.

8. The method of claim 1, wherein the membrane has a porosity in a range of 5% to 90%.

9. The method of claim 1, wherein the membrane has a porosity in a range of 40% to 60%.

10. The method of claim 1, wherein a ratio of a transport rate of lithium ions through the membrane to a transport rate of manganese ions through the membrane is in a range of 30:1 to 2:1.

11. The method of claim 1, wherein a ratio of a transport rate of lithium ions through the membrane to a transport rate of manganese ions through the membrane is greater than 15:1.

* * * * *